US009098515B2

(12) United States Patent
Richter et al.

(10) Patent No.: US 9,098,515 B2
(45) Date of Patent: Aug. 4, 2015

(54) DATA DESTRUCTION MECHANISMS

(75) Inventors: Matthias Richter, Sinsheim (DE);
Mathias Schoenecker, Hambruecken (DE)

(73) Assignee: SAP SE, Walldorf (DE)

( * ) Notice: Subject to any disclaimer, the term of this patent is extended or adjusted under 35 U.S.C. 154(b) by 49 days.

(21) Appl. No.: 13/297,011

(22) Filed: Nov. 15, 2011

(65) Prior Publication Data

US 2013/0124569 A1    May 16, 2013

(51) Int. Cl.
*G06F 17/30*    (2006.01)

(52) U.S. Cl.
CPC .... *G06F 17/30082* (2013.01); *G06F 17/30117* (2013.01)

(58) Field of Classification Search
CPC .................. G06F 17/30082; G06F 17/30085; G06F 17/30368
USPC .......... 707/640, 661–665, 672–674, 999.204; 706/46; 711/161, 100
See application file for complete search history.

(56) References Cited

U.S. PATENT DOCUMENTS

| | | | |
|---|---|---|---|
| 8,307,176 B1 * | 11/2012 | Wu et al. ........................ | 711/161 |
| 2008/0249972 A1 * | 10/2008 | Dillon .............................. | 706/46 |
| 2011/0314062 A1 * | 12/2011 | Boero et al. ................... | 707/792 |

* cited by examiner

*Primary Examiner* — Syling Yen
(74) *Attorney, Agent, or Firm* — Mintz Levin Cohn Ferris Glovsky and Popeo, P.C.

(57) ABSTRACT

Methods and apparatus, including computer program products, are provided for data destruction. In one aspect, there is provided a computer-implemented method. The method may include receiving a request to destroy a first data object; determining whether other data objects depend from the first data object; determining a structure for the first data object and the other data objects, when the other data objects depend from the first data object; initiating, based on the determined structure, calls to the other data objects to destroy the other data objects before the first data object; and initiating a call to the first data object to destroy the first data object, when the other data objects have been destroyed. Related apparatus, systems, methods, and articles are also described.

12 Claims, 7 Drawing Sheets

| Source Business Object | Target Business Object |
|---|---|
| Employee | WorkAgreement |
| WorkAgreement | TimeAgreement |
| TimeAgreement | EmployeeTime |
| Employee | ExpenseReport |

FIG. 3

| Source Business Object | Source Business Object Key | Target Business Object | Target Business Object Key |
|---|---|---|---|
| Employee | EE375 | WorkAgreement | WA001<br>WA002 |
| WorkAgreement | WA001<br>WA002 | TimeAgreement | TA777 |
| TimeAgreement | TA777 | EmployeeTime | ET1001<br>ET1002<br>ET1003 |
| Employee | EE375 | ExpenseReport | n.a. |

FIG. 4

DATA DESTRUCTION MECHANISMS

FIELD

The present disclosure generally relates to data destruction.

BACKGROUND

Companies are increasingly inundated with vast quantities of data. For example, companies may receive customer information, employee data, sales data, credit card transactions, emails, and the like. Much of this data is stored in an information warehouse or some other type of storage mechanism. Frequently companies destroy stored data to comply with company policy or legal requirements, especially when the stored data is considered "private." Private information may include health or medical information, personal employee data, sensitive financial information, and any other sensitive, non-public information. As such, information warehouses may periodically delete such private information.

SUMMARY

In one aspect, there is provided a computer-implemented method. The method may include receiving a request to destroy a first data object; determining whether other data objects depend from the first data object; determining a structure for the first data object and the other data objects, when the other data objects depend from the first data object; initiating, based on the determined structure, calls to the other data objects to destroy the other data objects before the first data object; and initiating a call to the first data object to destroy the first data object, when the other data objects have been destroyed.

In some implementations, one of more variations may be made as well as described in the detailed description below and/or as described in the following features. A data destruct manager may receive the request including an indication to destroy the first data object comprising at least one business object including at least one node and at least one association. The data destruct manager may access a metadata repository to determine whether other data objects depend from the first data object. The metadata repository may include a table including at least one of a plurality of registered dependencies to the first data object. The structure may be traversed from the first data object to at least one leaf node of the structure. A data retention time may be determined for at least one of the other data objects. The destruction of the at least one of the other data objects may be delayed based on the determined data retention time.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings,

FIG. 3 depicts an example of dependencies among business objects;

FIG. 4 depicts examples of business objects and target, dependent business objects having identifiers to identify the target business objects;

Figure 1:
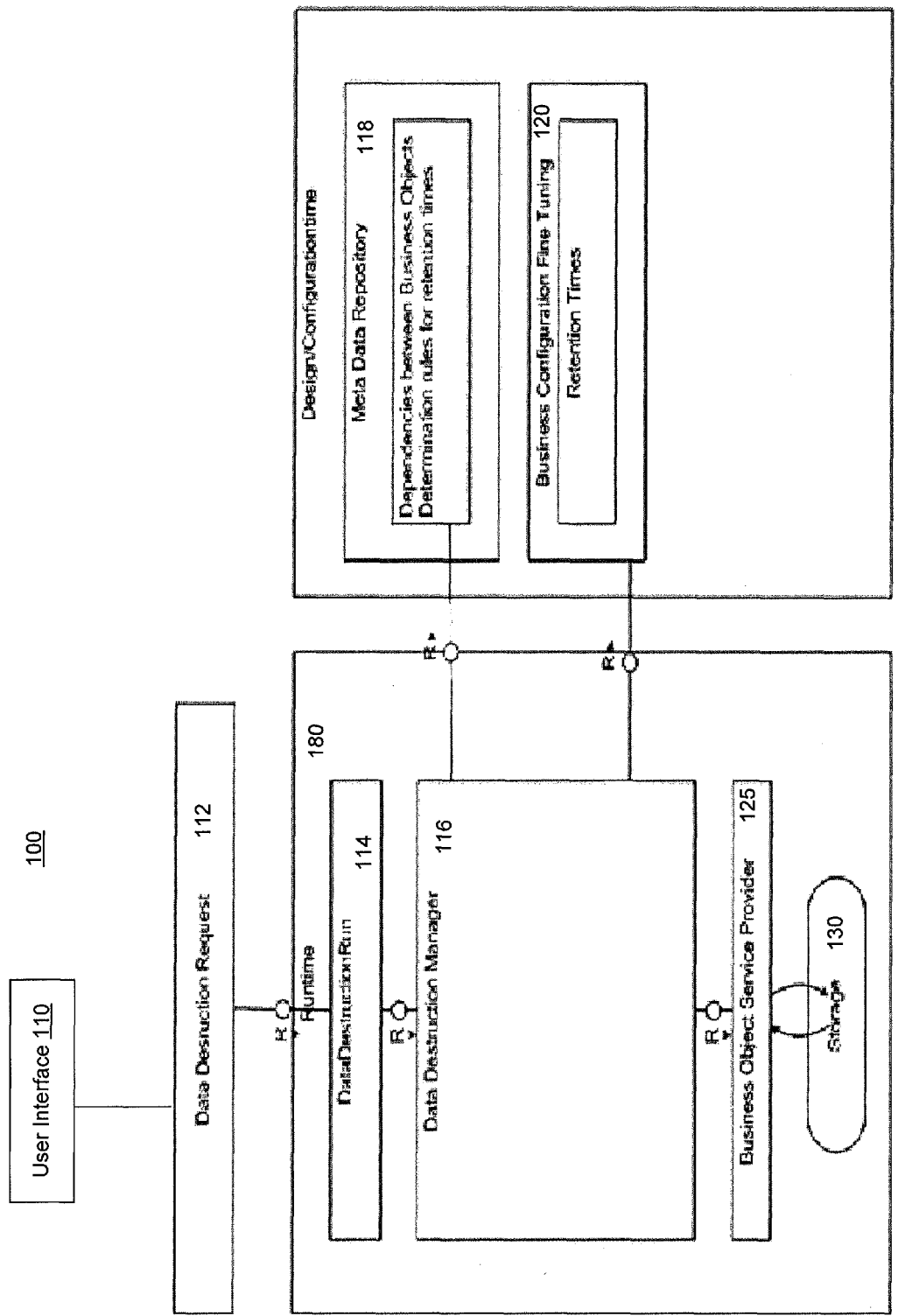
FIG. 1 depicts a block diagram of an example of a system for data destruction.

Like labels are used to refer to same or similar items in the drawings.

DETAILED DESCRIPTION

In most countries, privacy laws control the safekeeping and destruction of private, personal information. For example, in some instances, employers are required to destroy some, if not all, of the private, personal information of former employees, although some portions of private, personal information of former employees may be retained to comply with legal and tax laws. Moreover, such automatic data destruction mechanisms save resources by reducing the amount of storage required to save former employee private, personal information. Although automatically destroying private, personal information seems like a straightforward task, it is not as the destruction may need to be performed in a structured way to accommodate the structure of the data and the dependencies among the data. The subject matter described herein relates to mechanisms for automatically destroying private, personal information in a structured way.

FIG. 1 depicts a system 100 including user interface 110, a data destruction request 112, and a server 180 including a data destruction manager 116.

The user interface 110 may be implemented as any mechanism enabling interaction with the data and/or methods at server 180. For example, user interface 110 may be implemented as a browser or a thin client application.

The data destruction request 112 may be implemented as a message sent from the user interface 110 to the server 180 to request the destruction of a specific business object, such as for example a business object of a former employee (e.g., an employee business object).

The server 180 may be implemented as at least one processor and at least one memory. The server 180 may further include a program interface 114 (labeled data destruction run), the data destruction manager 116, a business object service provider 125 for providing structured data, such as for example business objects, and storage 130, where structured data, such as for example business objects, are stored. The server 180 may also include, or be coupled to, a metadata repository 118 and a configuration information 120.

When the data destruction request 112 is received at program interface 114, a call is made to the data destruction manager 116. For the specific business object included in the request 112, the data destruction manager 116 requests from the metadata repository 118 metadata describing any other business objects which depend from the specific business object. This metadata may also include other information, such as for example data stored at configuration information 120, where retention times for the business objects may be stored. For example, the data destruction request 112 may request from the metadata repository 118 metadata associated with the employee business object. The data destruction manager 116 may also request from configuration information 120 other information, such as for example retention times for the other business objects. The metadata stored at repository 118 may include the identity of any other business objects (e.g., a work agreement business object and the like) which depend from the employee business object. The retention information stored in configuration information 120 may include retention times defining when the employee business object and the other associated business objects may be destroyed (e.g., how long a business objected should be retained).

To further illustrate a business object, FIG. 2 will be described. Business applications may be used in connection with a business process, which may generate (and/or consume) business data. This business data may be structured in accordance with a predetermined format, such as for example a business object. A business object may be implemented as an object representing a business domain supported by the business application. For example, a sales order entry business application may have one or more business objects, which represent orders, line items, and sales orders being processes. The business object may also include methods (e.g., one or more functions) and data (e.g., attributes), which may also provide standardized, domain-specific access interfaces to the data. Business objects may be associated with other business objects to enable exchanges of information among the business objects.

Figure 2:
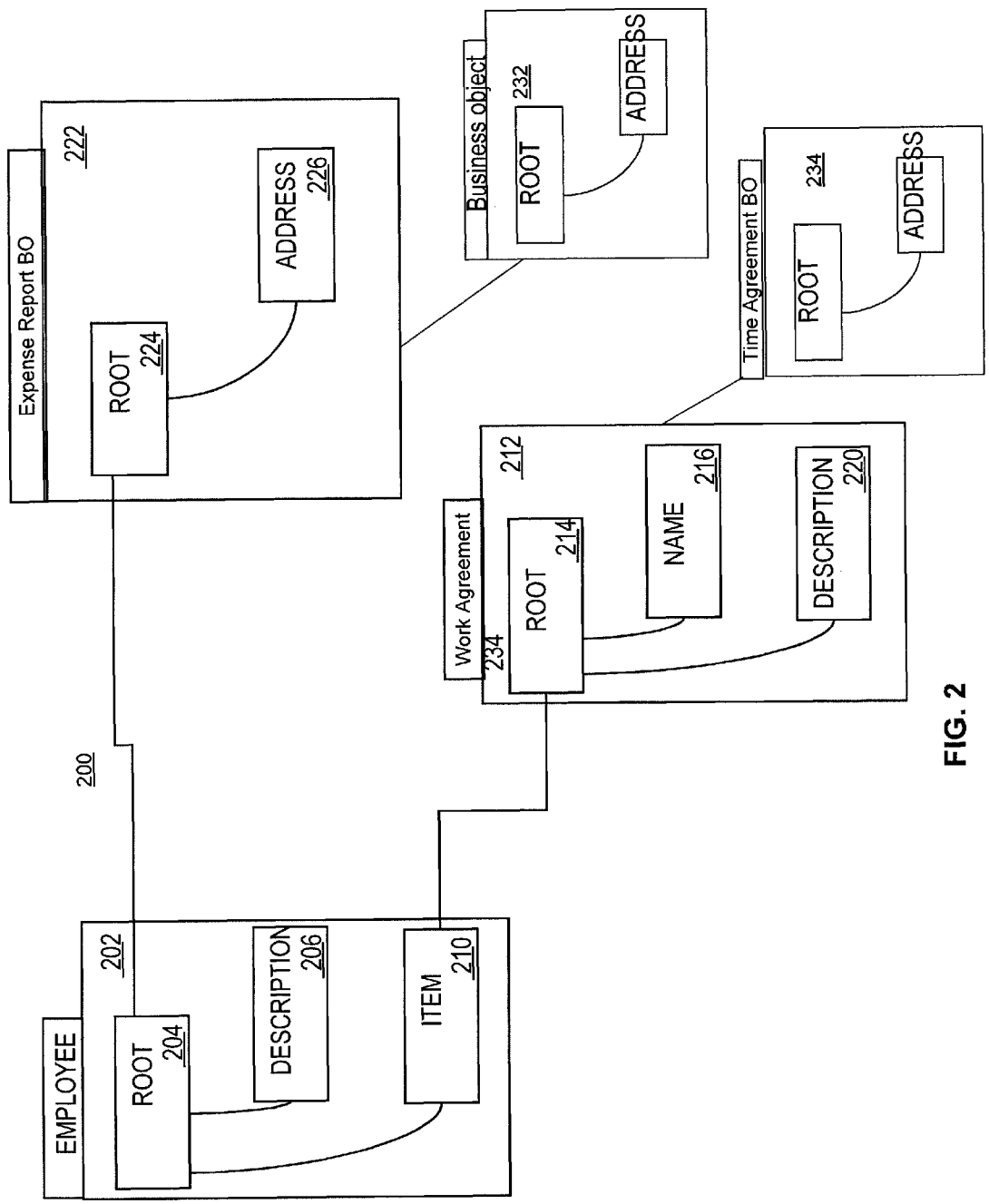
FIG. 2 depicts an example of business objects.

FIG. 2 shows a block diagram 200 illustrating an example of a business object. An employee business object 202 can include a root node 204 as well as a description node 206 describing attributes of the employee. An item node 210 can link to another business object, such as for example a work agreement business object 212 that includes a root node 214 as well as a name node 216 and a description node 220 that describes describing attributes of the employee's work agreement. The employee business object 202 can also link to another business object 222, such as for example an expense report business object. The business object 222 may include its own root node 224 and an address node 226 describing attributes of the business object 222. Business objects 212 and 222 may also be associated with other business objects, such as for example business objects 232 and 234, as depicted at FIG. 2. Although FIG. 2 depicts business objects representing employee data and a work agreement, other types of business objects may be used as well.

Referring to FIGS. 1 and 2, when the data destruction manager 116 initiates destruction of business objects, the dependency between items may also be determined. For example, if a business object instance is destroyed (for example employee business object 202), then the data destruction manager 116 may need to determine whether other business objects, such as for example business objects 222, 212, 232, and 234, should be destroyed. For example, when the data destruction manager 116 initiates destruction of the employee business object 202, the data destruction manager 116 may also determine that the business object 212 for the employee's work agreement (which is linked to, or dependent from, the employee business object 202) should also be destroyed. From the employee business object 202, there may be a variety of links including dependencies having multiple layers. As such, the data destruction manager 116 may have to determine, based on metadata obtained from repository 118, whether the relatively complex web of interdependent business objects associated with the employee business object 202 should be destroyed.

In some implementations, the data destruction manager 116 may destroy business objects starting at the so-called lower-level leaves. For example, the data destruction manager 116 may evaluate the structure 200 and determine any dependencies of among business objects from a source node, such as for example the employee business object 202, to each of the nodes of the first branch including leaves, e.g., work agreement business object 212 and time agreement business object 234, and the second branch including leaves, e.g., expense report business object 222 and business object 232. In this example, the data destruction manager 116 may initiate destruction from the lower-level leaves to the source node 202, so that no business object node is left without a higher-layer, parent business object. For example, the data destruction manager 116 would initiate destruction of business object 234 before work agreement business object 212, and the destruction of business object 232 would be initiated before business object 222. In addition, the data destruction manager 116 would initiate destruction of both the work agreement business object 212 and the expense report business object 222 before initiating the destruction of business object 202, so that no business object node is left without a higher-layer, parent business object during destruction.

In some implementations, the data destruction manager 116 may consider data retention times associated with the business object. For example, the data destruction manager 116 may consider data retention times and then delay, based on the retention time, destroying a business object, when the retention time requires the business object to be kept alive. The data retention time may be assigned by an entity, such as for example the entity responsible for the data. The data retention time may also be assigned according to one or more rules, such as for example legal requirements, company policy, and the like. In some implementations, the retention times for each business object are stored in configuration information 120.

In some implementations, the data destruction manager 116 may provide one or more of the following features: evaluate the data retention times of data, such as for example business objects; allow an evaluation of a data structure, such as for example business objects and their dependencies; evaluate which portions of the data structure (including dependent business objects) should be destroyed in accordance with one or more rules, such as for example retention times, legal requirements, company policy, and the like; initiate destruction in an all or nothing destruct mode (i.e., only destroy a root business object instance, such as for example employee business object node 202, when all of the corresponding dependent nodes 212, 222, 234, and 232 can be destroyed); provide a program interface to the business objects to call for the destruction of the affected dependent business objects; and provide a trust mechanism in which only a single, centralized entity, such as for example the data destruction manager, is able to destroy instances of business objects.

When the data destruction manager 116 evaluates the data structure of the business objects 200 to determine which business objects can be destroyed, the data destruction manager 116 may call each business object to initiate a destroy action, which is triggers a corresponding service provider 125 of a business object to delete the data associated with the business object being destroyed. For example, the data destruction manager 116 would initiate a call to a business object service provider handling each of business objects 202, 212, 234, 222, and 232. Each of the business object service provider(s) for the business object being destroyed may then delete data corresponding to the business object from database storage 130.

Moreover, the data destruction manager 116 may sequence the destruction calls to each of the business object service providers from the leaves so that destruction calls are sent first to the lower-level leaves as noted above (e.g., first call the business object service provider(s) for business object 234 and 232, then call the business object service provider(s) of work agreement business object 212 and expense report business object 222, and then finally call the service provider for business object 202), so that no business object node is left without a higher-layer, parent business object during destruction.

At designtime, a developer may define the existence of dependencies among business objects and store the dependency information as metadata at repository 118. This information is taken into account by the data destruction manager 116 to evaluate which dependent business objects must be notified in case of a destruction. FIG. 3 shows an example of dependencies between business objects maintained in the metadata repository 118. In this example, the business objects WorkAgreement and ExpenseReport are directly dependent from the Employee business object. If an Employee business object is destroyed, the data destruction manager 116 would also need to destroy the business objects WorkAgreement and ExpenseReport, and the TimeAgreement business object (which depends from the WorkAgreement business object) would need to be destroyed. In the example, of FIG. 3, the data destruction manager 116 may sequence for the destruction calls from the lower-layer leaves (e.g., first to the TimeAgreement business object and so forth).

At runtime, the data destruction manager 116 may also determine the dependencies among the business objects, such as for example the dependencies among business objects 202, 212, 222, 232, and 234. Referring to FIGS. 1-4, the data destruction request 112 for an employee with an identifier (ID) EE375 is received at program interface 114. The data destruction manager 116 may traverse the business objects to evaluate the dependencies among the business objects for employee, work agreement, time agreement, and the like. The work agreement business object 212 is registered in metadata stored at metadata repository 118 as dependent upon the employee business object 202. In the example of FIG. 4, the data destruction manager 116 may determine whether the implementation of the work agreement business object 212 should be destroyed, if the employee business object 202 with ID EE375 is to be destroyed. A service provider for the work agreement business object may provide information to the data destruction manager 116 that the work agreement business object having identifiers ID WA001 and WA002 should be destroyed, when the business object for employee EE375 is destroyed. The data destruction manager 116 may then proceed to evaluate from the metadata stored at repository 120 that the time agreement business object 234 depends from the work agreement business object 212.

The data destruction manager 116 may then call the service provider for the time agreement business object to determine which time agreements should be destroyed when the WorkAgreement business objects having identifiers WA001 and WA002 are destroyed. In response, the service provider indicates that the employee time business object having identifiers ID ETI001, ETI002, and ETI003 should be destroyed. After the destruction manager 120 obtains relevant information for the business objects that should be destroyed, the data destruction manager 116 triggers the destruction starting from the bottom up, i.e., from the lower-layer leaves to the top-layer business object for employee EE375. In this example, the data destruction manager 120 initiates destruct calls first to the employee time business object service provider, followed by time agreement business object service provider, the work agreement business object service provider, and then the employee business object service provider.

Figure 5:
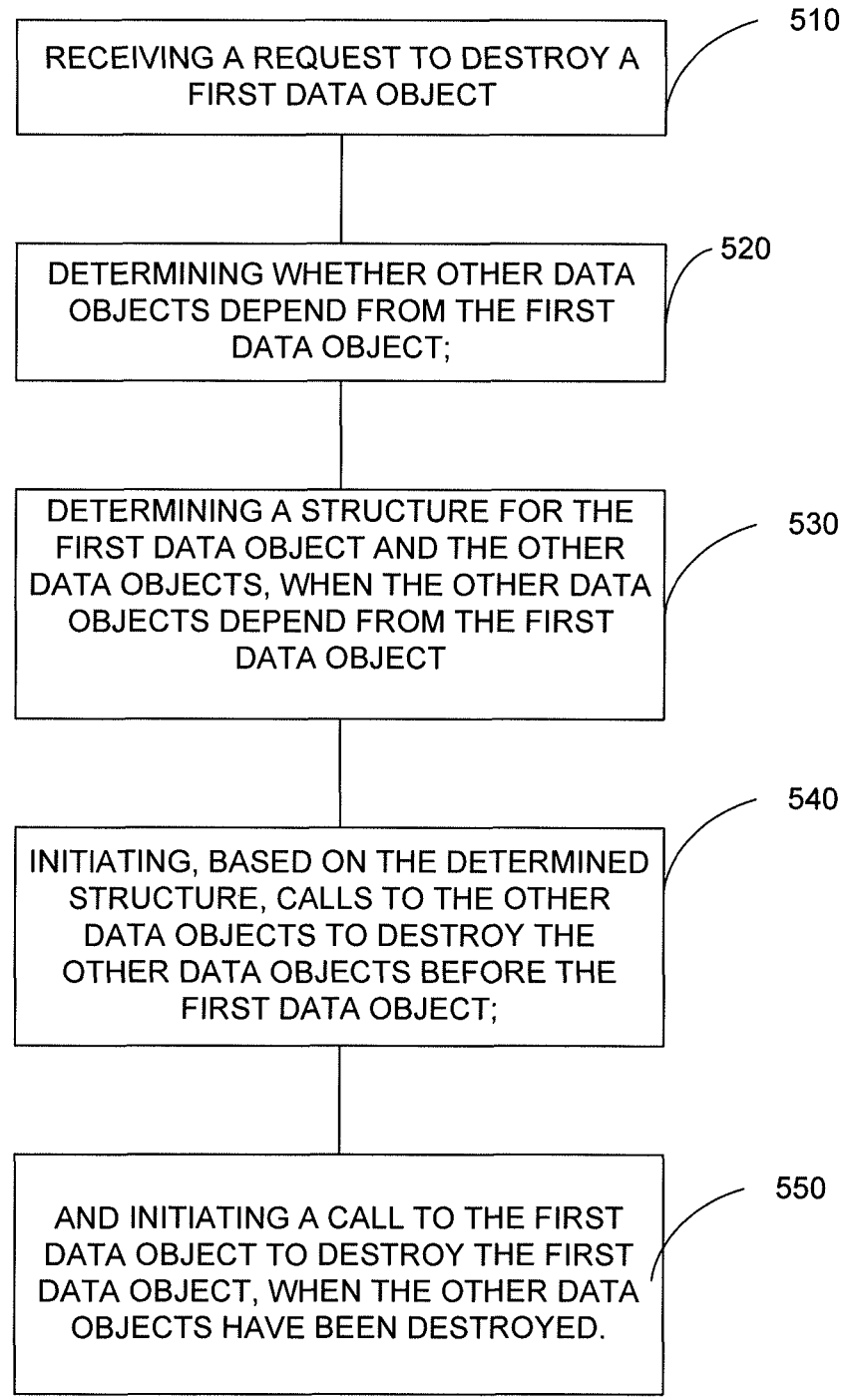
FIG. 5 depicts an exemplary process for data destruction.

FIG. 5 depicts a process for destroying structured data.

At 510, a request is received to destroy a first data object. For example, data destruction manager 116 may receive a data destruction request 112 to destroy a business object associated with employee Jane Doe.

At 520, a determination is made whether other data objects depend from the first data object. For example, data destruction manager 116 may access metadata repository 118 to determine whether any other business objects depend from the employee business object for employee Jane Doe. In some implementations, a table is used to determine any registered dependencies to the business object for employee Jane Doe. FIG. 3 depicts an example of such a table.

At 530, a structure is determined for the first data object and the other data objects. For example, data destruction manager 116 may determine the structure of the employee business object and any dependent business objects, such as for example business objects 222, 212, 232, and 234 depicted in FIG. 2. The data destruction manager 116 may also determine data retention times for each of the business objects, and exclude from destruction one or more business objects based on the retention times.

At 540, calls may be initiated, based on the determined structure, to the other data objects to destroy the other data objects before the first data object. In some implementations, data destruction manager 116 may first call each business object service provider to request a destruction of the lower level leaves of the structure, and then move up the tree to the root business object for employee 202. In this example, the data destruction manager 116 may initiate destruction from the lower level leaves to the source business object 202, so that no business object is left without a higher-layer, parent business object. For example, the data destruction manager 116 would initiate destruction of business object 234 before work agreement business object 212, and the destruction of business object 232 would be initiated before business object 222. Moreover, the data destruction manager 116 would initiate destruction of both the work agreement business object 212 and the expense report business object 222 before initiating the destruction of business object 202, so that no business object node is left without a higher-layer, parent business object during destruction. At 550, a call is finally made to initiate destruction of the first data object, such as for example business object 202, to destroy the first data object, when the other data objects have been destroyed.

Figure 6:
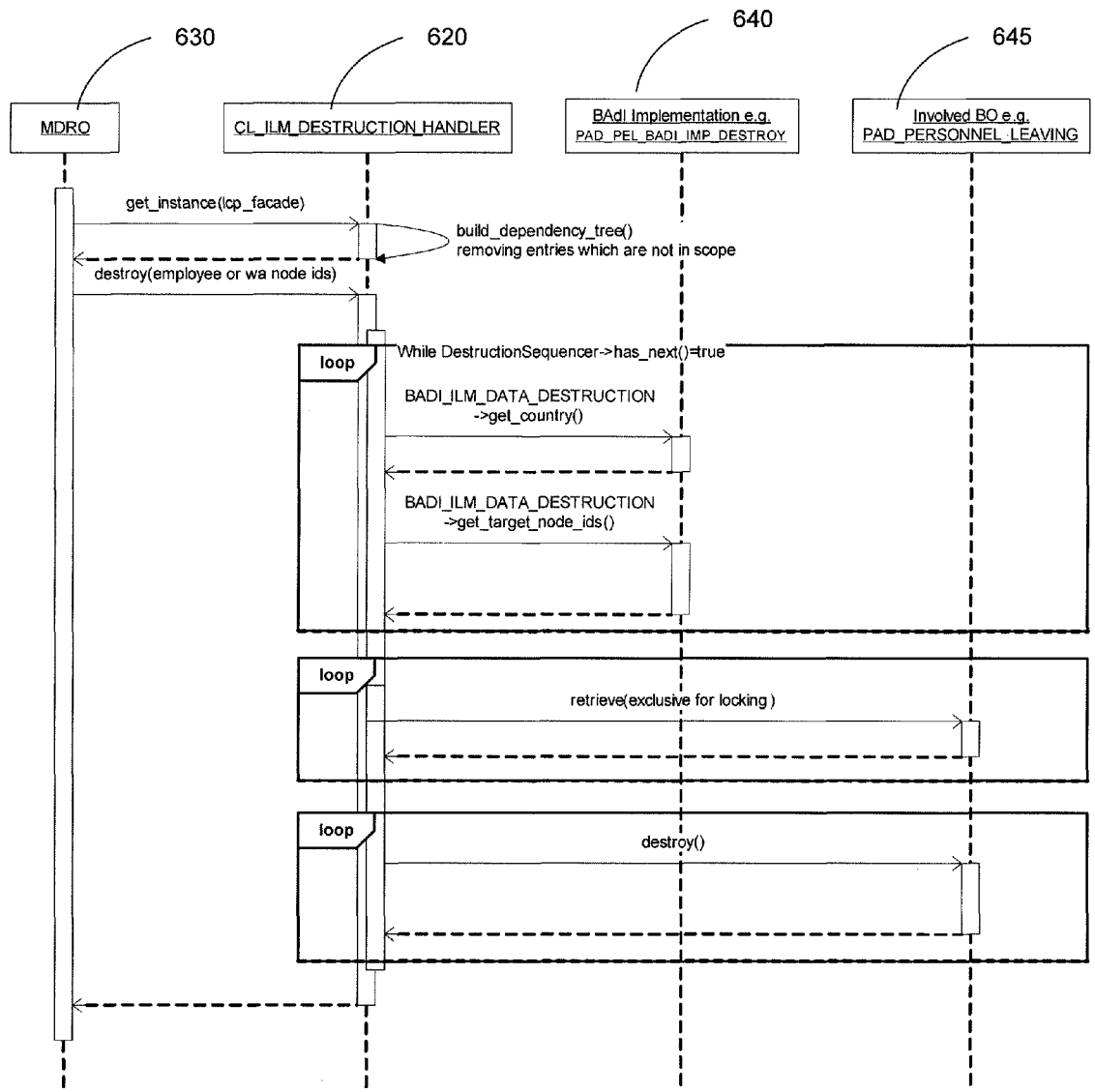
FIGS. 6 and 7 depict exemplary processes for data destruction.

FIG. 6 depicts a process 600 for destroying structured data. Referring to FIG. 6, the data destruction manager 620 (labeled "CL_ILM_DESTRUCTION_HANDLER") receives a call from a mass data run object 630 to destroy data. The destruction manager 620 then builds a dependency tree defining the dependencies among the business objects to be destroyed. In some instances, a business object, which should not be destroyed, is omitted and thus considered out of scope. The data destruct manager 120 traverses through the data structure to identify business objects which should be destroyed, implements a lock on the affected business objects, and issues a destroy call to initiate the destruction.

For example, each change to a business object may be tracked in the change document (see, e.g., 755 at FIG. 7) in a generic way. Those changes may include the information about the change records structures according to family name, address, and the like. The destruction mechanism takes care of the deletion of the business object related change documents as well. As such, the destruct mechanism collects the involved business objects and their corresponding change documents to allow deletion of both the business objects and change documents. In some implementations, the logging of change documents may be suppressed.

Figure 7:
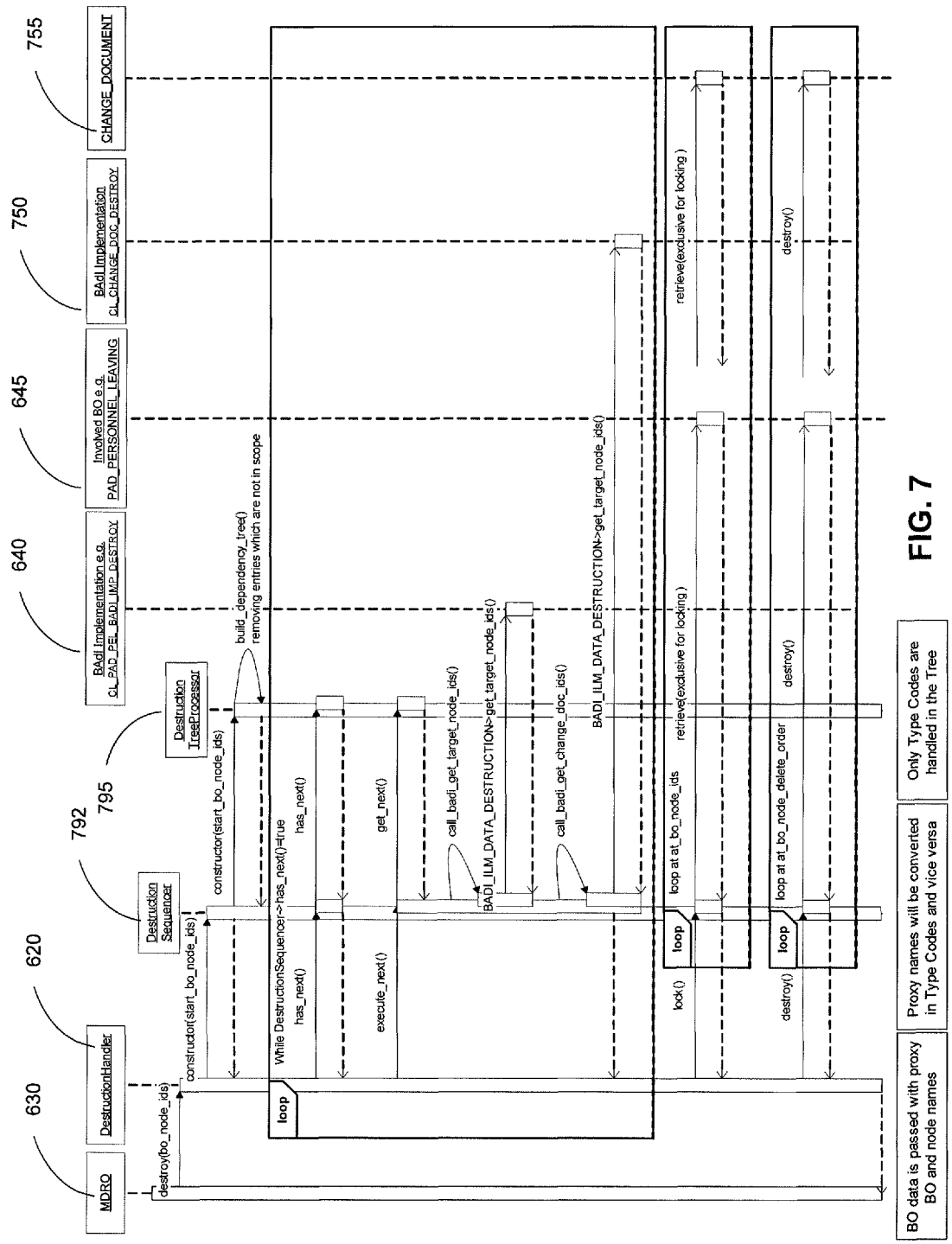

FIG. 7 depicts another process 700 for destroying structured data. The process 700 is similar to the process 600 in some respect but further depicts details associated with a destruction sequencer 792 for sequencing the destruction of business objects (e.g., from the lower-layer business objects to the top-layer parent business objects as described herein), a destruction tree processor 795 for determining the dependencies among the business objects to be destroyed, and a change tracking mechanism (e.g., 755) to track the changes.

Referring to FIG. 7, the destruction manager 620 (labeled DESTRUCTION HANDLER) receives a call from a mass data run object 630 to destroy data. The destruction manager 620 calls destruction sequencer 792 and destruction tree processor 795 to build a dependency tree defining the dependencies among the business objects to be destroyed. Next, the destruction sequencer 792 calls each of the service providers for the business objects being deleted. The destruction sequencer 792 may also implements a lock on the affected business objects, and then issue a destroy call to initiate the destruction.

In some implementations, the destruction manager (labeled destruction handler) includes three parts, each of which is represented by an own class implementation. The first class, CL_ILM_DESTRUCTION_HANDLER, is an access class to complete the destruction mechanism (e.g., out of the mass destruct handler, MDRO). The CL_ILM_DESTRUCTION_HANDLER class allows the destruction itself via the DESTROY action as well as all other checks during the destruction run. This may also check whether the system is in a destruction mode or whether the node identifiers (NODE_IDS) which identify business objects passed to the EXECUTE_ACTION of a dedicated business object are actually to be included in the destruction run.

The second class is CL_ILM_DESTRUCTION_SEQUENCER, which is called out of the CL_ILM_DESTRUCTION_HANDLER. CL_ILM_DESTRUCTION_SEQUENCER class is responsible for instantiating the destruction tree. With the tree information, CL_ILM_DESTRUCTION_SEQUENCER is able to determine relevant information for the destruction via a call to the service providers (e.g., BAdI 640 including any specific involved business objects 645 and 755) to of each registered business object. For example, the CL_ILM_DESTRUCTION_SEQUENCER may implement a call of BAdI method GET_TARGET_NODE_IDS to obtain the node identifiers of the business object nodes to be destroyed. To improve the performance during runtime, the tree search may be restricted to a specific country associated with a current deletion (e.g., by a BAdI method call GET_COUNTRY). The CL_ILM_DESTRUCTION_SEQUENCER may also be responsible for any mapping or conversion of any business objects.

The third class, CL_ILM_DESTRUCTION_TREE_PROC, is called by the CL_ILM_DESTRUCTION_SEQUENCER to traverse the tree. The CL_ILM_DESTRUCTION_TREE_PROC starts with a source business object node type code and allows the destruction sequencer 792 with the help of the dependency definition (e.g., out of ILM_I_DESTR_TREE) to traverse the tree (or structure) of business objects being destroyed.

The destruction tree processor 795 may include a table for registering dependencies. In some implementations, the destruction tree processor 795 may use a system table (S-table) to traverse the business objects. An example of an S-Table is depicted below at Table 1.

TABLE 1

Table ILM_I_DESTR_TREE

| FIELDNAME | DATA ELEMENT | Foreign Key Table |
|---|---|---|
| SOURCE_BO_TYPE_CODE | AP_BO_TYPE_CODE | APC_C_OTC |
| SOURCE_BO_NODE_TYPE_CODE | AP_OBJECT_NODE_TYPE_CODE | APC_C_ONTC |
| TARGET_BO_TYPE_CODE | AP_BO_TYPE_CODE | APC_C_OTC |
| TARGET_BO_NODE_TYPE_CODE | AP_OBJECT_NODE_TYPE_CODE | APC_C_ONTC |
| COUNTRY | AP_COUNTRY_CODE | |

In some implementation, country information associated with a business object is used for performance reasons to avoid unnecessary initializations and calls to business object service providers (e.g., 640 and 750).

Table 2 below provides an example of metadata registering dependencies among business objects. The metadata may be are stored in metadata repository 118.

TABLE 2

| Source Bo Type | Source Bo Node Type | Target BO Type Code | Target BO Node Type Code |
|---|---|---|---|
| Workagreement | Root | Transfer | Root |
| Workagreement | Root | CompAgreement | Item |
| Workagreement | Root | TimeAgreement | Item |
| TimeAgreement | Item | EmployeeTime | Root |

Table 3 below depicts an example of an internal runtime table used by destruction manager 620.

TABLE 3

| Level | Source Bo Type | Source Bo Node Type | Source Bo Node ID | Veto Indicator | Target BO Type Code | Target BO Node Type Code | Target BO Node ID | Tree Start |
|---|---|---|---|---|---|---|---|---|
| 1 | Work-agreement | Root | 1 | X | Transfer | Root | H0 | WA/Root/1 |
| 1 | Work-agreement | Root | 2 | | Transfer | Root | H1 | WA/Root/2 |
| 1 | Work-agreement | Root | 3 | | Transfer | Root | H3 | WA/Root/3 |
| 1 | Work-agreement | Root | 2 | | Time-Agreement | Item | Tim1 | WA/Root/2 |

TABLE 3-continued

| Level | Source Bo Type | Source Bo Node Type | Source Bo Node ID | Veto Indicator | Target BO Type Code | Target BO Node Type Code | Target BO Node ID | Tree Start |
|---|---|---|---|---|---|---|---|---|
| 1 | Work-agreement | Root | 3 | X | Time-Agreement | Item | Tim3 | WA/Root/3 |
| 2 | Time-Agreement | Item | Tim1 | X | Employee-Time | Root | ET1 | WA/Root/2 |

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter use employee data to illustrate the examples above, the current subject matter is applicable to other types of data as well. Furthermore, the phrases "based on" and "based on at least" are used interchangeably herein as both phrases are equivalent. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure a processor to perform operations comprising:
   receiving, at a data destruct manager, a request, from a user interface, to destroy a first data object;
   determining, by the data destruct manager, whether other data objects depend from the first data object;
   determining, by the data destruct manager when the other data objects depend from the first data object, a structure for the first data object and the other data objects by at least traversing the structure from the first data object to at least one leaf node of the other data objects of the structure and determining a data retention time for the other data objects including the at least one leaf node;
   initiating, by the data destruct manager, calls, based on the determined structure, to the other data objects to destroy the other data objects before the first data object, when at least one rule and the data retention times of the other data objects including the at least one leaf node indicate destruction is allowed;
   initiating, by the data destruct manager when the other data objects have been destroyed, a call to the first data object to destroy the first data object, when the at least one rule and the data retention times of the other data objects including the at least one leaf node indicate destruction is allowed; and
   inhibiting, by the data destruct manager, the destruction of at least one of the other data objects and the first data object, when the at least one rule and the data retention times of the at least one other data objects indicate destruction is not allowed, wherein the at least one rule comprises at least one of a legal requirement regarding retention or a company policy regarding retention.

2. The non-transitory computer-readable medium of claim 1, wherein the receiving further comprises:
   receiving, at the data destruct manager, the request including an indication to destroy the first data object comprising at least one business object including at least one node and at least one association.

3. The non-transitory computer-readable medium of claim 1, wherein the determining whether further comprises:
   accessing, by the data destruction manager, a metadata repository to determine whether other data objects depend from the first data object.

4. The non-transitory computer-readable medium of claim 3, wherein the metadata repository includes a table including at least one of a plurality of registered dependencies to the first data object.

5. A method comprising:
receiving, at a data destruct manager, a request, from a user interface, to destroy a first data object;
determining, by the data destruct manager, whether other data objects depend from the first data object;
determining, by the data destruct manager when the other data objects depend from the first data object, a structure for the first data object and the other data objects by at least traversing the structure from the first data object to at least one leaf node of the other data objects of the structure and determining a data retention time for the other data objects including the at least one leaf node;
initiating, by the data destruct manager, calls, based on the determined structure, to the other data objects to destroy the other data objects before the first data object, when at least one rule and the data retention times of the other data objects including the at least one leaf node indicate destruction is allowed;
initiating, by the data destruct manager when the other data objects have been destroyed, a call to the first data object to destroy the first data object, when the at least one rule and the data retention times of the other data objects including the at least one leaf node indicate destruction is allowed; and
inhibiting, by the data destruct manager, the destruction of at least one of the other data objects and the first data object, when the at least one rule and the data retention times of the at least one other data objects indicate destruction is not allowed, wherein the at least one rule comprises at least one of a legal requirement regarding retention or a company policy regarding retention.

6. The method of claim 5, wherein the receiving further comprises:
receiving, at the data destruct manager, the request including an indication to destroy the first data object comprising at least one business object including at least one node and at least one association.

7. The method of claim 5, wherein the determining whether further comprises:
accessing, by the data destruction manager, a metadata repository to determine whether other data objects depend from the first data object.

8. The method of claim 7, wherein the metadata repository includes a table including at least one of a plurality of registered dependencies to the first data object.

9. A system comprising:
at least one processor; and
at least one memory, wherein the at least one processor and the at least one memory are configured to provide operations comprising:
receiving, at a data destruct manager, a request, from a user interface, to destroy a first data object;
determining, by the data destruct manager, whether other data objects depend from the first data object;
determining, by the data destruct manager when the other data objects depend from the first data object, a structure for the first data object and the other data objects by at least traversing the structure from the first data object to at least one leaf node of the other data objects of the structure and determining a data retention time for the other data objects including the at least one leaf node;
initiating, by the data destruct manager, calls, based on the determined structure, to the other data objects to destroy the other data objects before the first data object, when at least one rule and the data retention times of the other data objects including the at least one leaf node indicate destruction is allowed;
initiating, by the data destruct manager when the other data objects have been destroyed, a call to the first data object to destroy the first data object, when the at least one rule and the data retention times of the other data objects including the at least one leaf node indicate destruction is allowed; and
inhibiting, by the data destruct manager, the destruction of at least one of the other data objects and the first data object, when the at least one rule and the data retention times of the at least one other data objects indicate destruction is not allowed, wherein the at least one rule comprises at least one of a legal requirement regarding retention or a company policy regarding retention.

10. The system of claim 9, wherein the receiving further comprises:
receiving, at the data destruct manager, the request including an indication to destroy the first data object comprising at least one business object including at least one node and at least one association.

11. The system of claim 10, wherein the determining whether further comprises:
accessing, by the data destruction manager, a metadata repository to determine whether other data objects depend from the first data object.

12. The system of claim 11, wherein the metadata repository includes a table including at least one of a plurality of registered dependencies to the first data object.

* * * * *